US008884962B2

(12) United States Patent
Kmiecik et al.

(10) Patent No.: US 8,884,962 B2
(45) Date of Patent: Nov. 11, 2014

(54) COMPUTER ARRANGEMENT FOR AND METHOD OF MATCHING LOCATION DATA OF DIFFERENT SOURCES

(75) Inventors: Marcin Michal Kmiecik, Lodz (PL); Wojciech Tomasz Nowak, Konstantynow Lodzki (PL)

(73) Assignee: TomTom Global Content B.V., Eindhoven (NL)

( * ) Notice: Subject to any disclaimer, the term of this patent is extended or adjusted under 35 U.S.C. 154(b) by 881 days.

(21) Appl. No.: 12/311,471

(22) PCT Filed: Oct. 20, 2006

(86) PCT No.: PCT/NL2006/050264
§ 371 (c)(1),
(2), (4) Date: Dec. 7, 2009

(87) PCT Pub. No.: WO2008/048088
PCT Pub. Date: Apr. 24, 2008

(65) Prior Publication Data
US 2010/0091020 A1 Apr. 15, 2010

(51) Int. Cl.
*G06T 15/10* (2011.01)
*G01C 21/28* (2006.01)
*G01C 11/02* (2006.01)

(52) U.S. Cl.
CPC ........... *G01C 21/28* (2013.01); *G01C 11/02* (2013.01)
USPC ............ 345/427; 345/582; 345/672; 382/217

(58) Field of Classification Search
USPC ........... 345/672, 427, 582; 382/285, 294, 217
See application file for complete search history.

(56) References Cited

U.S. PATENT DOCUMENTS

| 2004/0051711 | A1 | 3/2004 | Dimsdale et al. |
| 2004/0167709 | A1* | 8/2004 | Smitherman et al. ......... 701/208 |
| 2005/0113994 | A1* | 5/2005 | Bell et al. ........................ 701/35 |
| 2007/0260137 | A1* | 11/2007 | Sato et al. ..................... 600/407 |
| 2010/0091017 | A1* | 4/2010 | Kmiecik et al. .............. 345/420 |

FOREIGN PATENT DOCUMENTS

| DE | 10 2004 01019 | 9/2005 |
| EP | 1 681 538 | 7/2006 |
| EP | 1681538 A | 7/2006 |
| JP | 2002031528 A | 1/2002 |

(Continued)

OTHER PUBLICATIONS

Zhao, H., Shibasaki, R., 2004. Updating digital geographic database using vehicle-borne laser scanners and line cameras. International Archives of Photogrammetry, Remote Sensing and Spatial Information Sciences 35 (Part 3), p. 111-119.*

(Continued)

*Primary Examiner* — Maurice L McDowell, Jr.

(57) ABSTRACT

A computer arrangement is disclosed, including a processor and a memory that stores a computer program, object data originating from a first source and including object location data, and laser samples originating from a second source, including a sub-set of laser samples relating to the object and including laser sample location data as to each laser sample. In at least one embodiment, the processor compares the object location data and the laser sample location data of the sub-set of laser samples, and matches the object location data to the laser sample location data of the sub-set of laser samples based on this comparison, and thereby corrects for relative positional errors between the first and second sources of location data. The object may be a building façade, for example.

6 Claims, 10 Drawing Sheets

(56) References Cited

FOREIGN PATENT DOCUMENTS

| | | | |
|---|---|---|---|
| JP | 2004265396 A | 9/2004 | |
| JP | 2004348575 A | 12/2004 | |
| WO | 98012504 A | 3/1998 | |
| WO | WO 98/12504 | 3/1998 | |
| WO | 2005038402 A1 | 4/2005 | |
| WO | 2006090896 A | 8/2006 | |
| WO | WO 2006/090896 | 8/2006 | |
| WO | WO 2006090896 A1 * | 8/2006 | |

OTHER PUBLICATIONS

Zhao, H., Shibasaki, R., 2003, Special Issue on Computer Vision System: Reconstructing Textured CAD Model of Urban Environment using Vehicle-borne Laser Range Scanner and Line Cameras, Machine Vision and Applications, 14 (2003), p. 35-41.*

U Zhao, H., Shibasaki, R., 2004. "Updating digital geographic database using vehicle-borne laser scanners and line cameras", International Archives of Photogrammetry, Remote Sensing and Spatial Information Sciences 35 (Part 3), p. 111-119.*

Zhao, H., Shibasaki, R., 2003, Special Issue on Computer Vision System: "Reconstructing Textured CAD Model of Urban Environment using Vehicle-borne Laser Range Scanner and Line Cameras", Machine Vision and Applications, 14 (2003), p. 35-41.*

Huijing Zhao et al. "Updating a Digital Geographic Database Using Vehicle-Borne Laser Scanners and Line Cameras." Photogrammetric Engineering and Remote Sensing, American Society for Photogrammetric and Remote, U.S., vol. 71, No. 4, Apr. 2005, pp. 415-424.

Kiichiro Ishikawa et al. "A mobile mapping system for road data capture based on 3D road model." 2006 IEEE Conference on Computer Aided Control System Design, 2006 IEEE International Conference on Control Applications, 2006 IEEEE International Symposium on Intelligent Control, Oct. 4, 2006, pp. 367-371.

Takuji Takahasi et al, "Arbitrary View Rendering System Using Omni Directional Image", IPSJ Transactions, Information Processing Society of Japan, Dec. 15, 2001, vol. 42, No. Sig 13 (CVIM3), p. 99-109.

Akimasa Hashimoto et al., "Outdoor Annotation System by Sensor Fusion", IEICE Technical Report, IEICE, Sep. 5, 2006, vol. 106, No. 234, p. 97-102.

Takashi Ishikawa et al., Accurate Estimation of Pose and Location using Image Processing for Mobile Outdoor AR System, IPSJ SIG Technical Reports, Information Processing Society of Japan, Mar. 4, 2005, vol. 2005, No. 18, p. 181-188.

International Search Report issued Sep. 11, 2007 for International Application No. PCT/NL2006/050264.

XP009085661 "Updating a Digital Geographic Database using Vehicle-Borne Laser scanners and Line cameras" Apr. 2005.

XP009085657 "A mobile mapping system for road data capture based on 3D road model" 2006, IEEE.

* cited by examiner

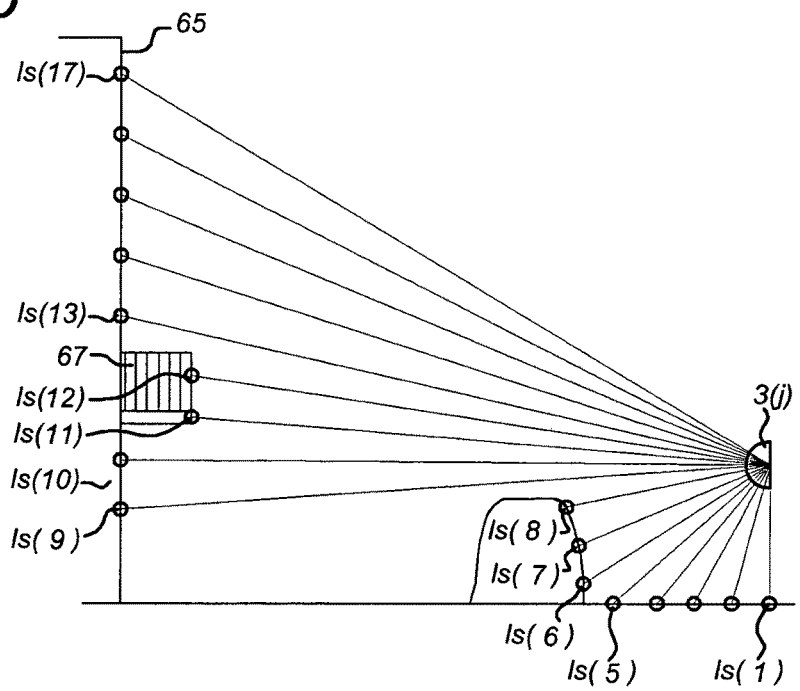
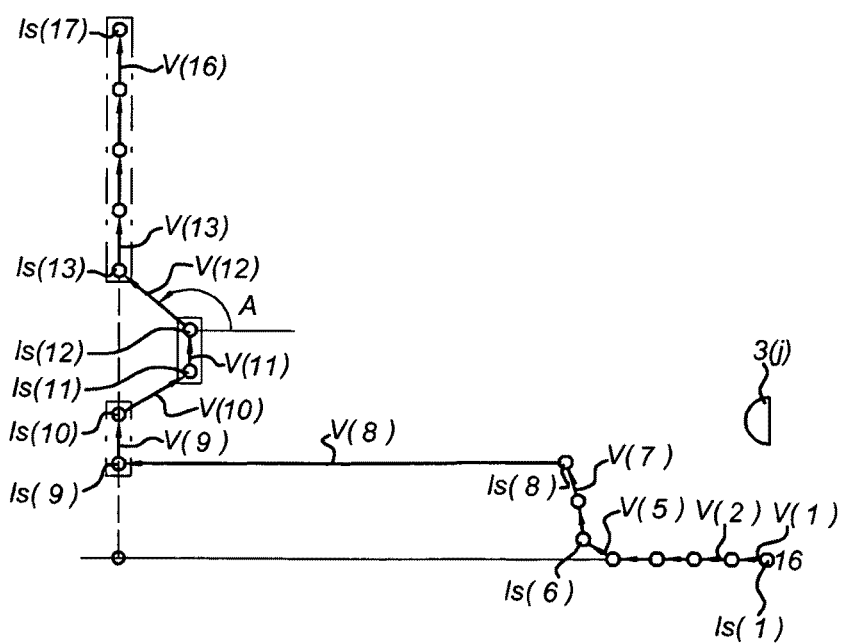

COMPUTER ARRANGEMENT FOR AND METHOD OF MATCHING LOCATION DATA OF DIFFERENT SOURCES

FIELD OF THE INVENTION

The present invention relates to matching location data of building block façades to façade location data derived from laser scanners on a geo-positioned mobile mapping system. The laser scanners may be 2D rotating but the field of application is not restricted hereto.

PRIOR ART

Systems for and methods of matching location data of building block façades which originate from a source, like cameras on a mobile mapping system, to façade location data originating from an other source like aerial images are known from the prior art. Likewise, it is known to detect texture elements in the building block façades and to replace them by standard texture elements such that only a few of these standard texture elements need be stored in a memory, thus saving memory space.

However, currently used processes may require significant human interaction to have the required correlation between these two sources. The speed of manual matching may be on average 2 km/h which in total would bring a cost of many thousands man hours for mapping these two sources for an average city.

Moreover, mapping texture element data used in a façade texturing process needs synchronization with 3D building block data. To achieve an industrial process with an acceptable level of quality, the maximum positional deviation between both sources should be less than 0.5 m. However, typical positional accuracies associated with these separate sources are not below 1 m, which may result in unacceptable levels of quality in the matching process.

It is therefore desired to provide a system and method that provide a higher level of accuracy when matching these data from the two different sources.

SUMMARY OF THE INVENTION

In its broadest context, the invention relates to a computer arrangement comprising a processor arranged to communicate with a memory storing a computer program comprising instructions and data that can be run by the processor, and storing object data originating from a first source and including object location data, and storing laser samples originating from a second source, including a sub-set of laser samples relating to the object and including laser sample location data as to each laser sample, the processor being arranged to make a comparison between the object location data and the laser sample location data of the sub-set of laser samples, and to match the object location data to the laser sample location data of the sub-set of laser samples based on this comparison, thereby correcting for relative positional errors between the first and second sources of location data.

This provides a matching of location data of objects originating from the first source (for instance aerial pictures) to location data of laser samples obtained from a second source (for instance a laser scanner located on an earth bound vehicle).

In an embodiment, the object is a building façade.

In a further embodiment, the invention relates to such a computer arrangement, wherein the memory also stores photographic pictures including texture information of the building façade, the photographic pictures originating from a third source having a known location in relation to the second source, and the processor is arranged to provide the building façade as obtained with the first source with the texture information while using the matching of the building façade location data to the laser sample location data of the sub-set of laser samples.

Thus, the system and method as claimed in their broadest context may be used in a process of automatic synchronization, or position matching, between the first and third sources, as referred to in the introduction above, using laser scanner data. In an embodiment, the second and third sources are located on an MMS system, and the first source is an aerial photograph. Then, in effect, the relative position error between the MMS picture and the building derived from the aerial photograph can be eliminated or dramatically reduced.

The invention is based on the insight that any processes taking into account two different sources does not really require absolute accuracy of both sources. The system and method, however, does require a high level of positional correlation, to achieve the automated processes.

By applying the system and method according to the invention, the human interaction can be reduced by a factor as high as 95%.

In an embodiment, only some correlation points are processed. Since the local mobile mapping system with which pictures are taken may have a high relative accuracy, it is not necessary to exactly determine a shift vector for each position at which a picture is taken: such individual shift vectors can be calculated as a weighted sum of shift vectors processed for correlation points in the neighbourhood.

The invention also relates to a method as performed by such a computer arrangement, a computer program product allowing the computer arrangement to perform that method and a data carrier storing such a computer program product.

In another aspect of the invention, it relates to a computer arrangement comprising a processor arranged to communicate with a memory storing a computer program comprising instructions and data that can be run by the processor, and storing a plurality of series of consecutive laser samples relating to a plurality of physical objects and including laser sample location data as to each laser sample, each series of laser samples lying in a separate plane substantially perpendicular to the earth, the processor being arranged to calculate a series of consecutive vectors, each series of consecutive vectors being associated with a series of laser samples, each vector having a beginning point in a laser sample and an end point in a next laser sample in the series of consecutive laser samples, and to identify shapes of at least portions of those objects based on the consecutive vectors.

Also in this other aspect the invention relates to a method as performed by such a computer arrangement, a computer program product allowing the computer arrangement to perform that method and a data carrier storing such a computer program product.

BRIEF DESCRIPTION OF THE DRAWINGS

The invention will be explained in detail with reference to some drawings that are intended to illustrate the invention but not to limit its scope which is defined by the annexed claims and its equivalent embodiments.

In the drawings:

FIGS. 9b and 9c and 10 show how laser samples can be selected that are associated with a building façade;

DESCRIPTION OF THE PREFERRED EMBODIMENT

The invention will be explained with reference to pictures of building block façades as obtained by cameras on an MMS system, footprints of those building blocks as obtained from aerial pictures and laser scan samples as obtained from laser scanners on the MMS system. However, the idea of matching location data of different sources while using laser samples has a larger implementation capability than just this context.

In an embodiment of the invention, building block façade data as obtained by one or more cameras on a mobile mapping system (MMS) is processed. Moreover, laser scan data as obtained by one or more laser scanners on such a MMS system may be used.

Figure 1:
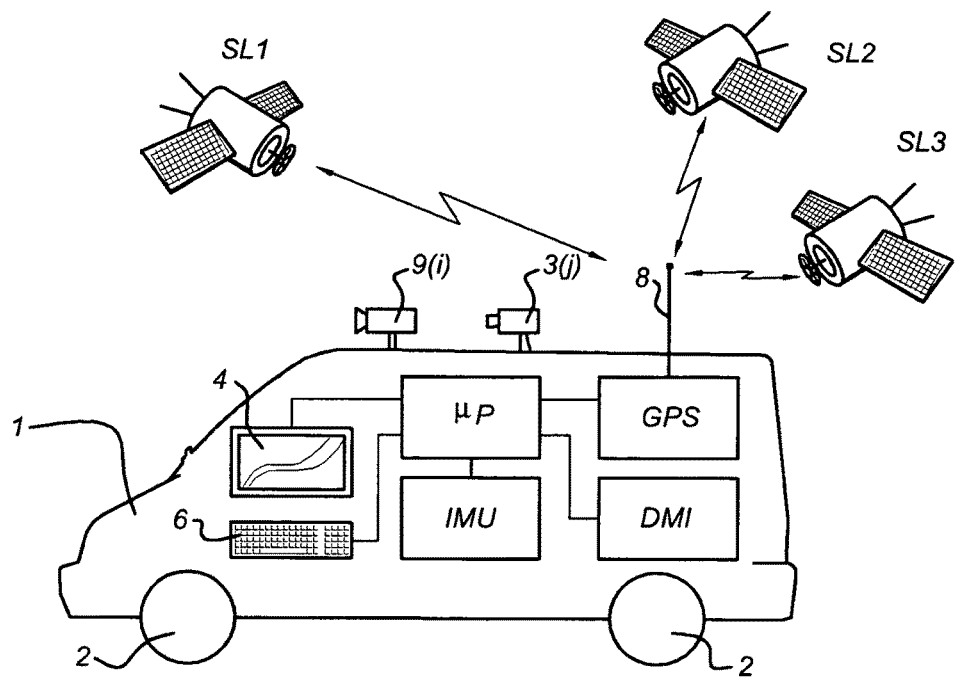
FIG. 1 shows a MMS system with a camera and a laser scanner.

FIG. 1 shows a MMS system that takes the form of a car 1. The car 1 is provided with one or more cameras 9(i), i=1, 2, 3, ... I, and one or more laser scanners 3(j), j=1, 2, 3, ... J. The car 1 can be driven by a driver along roads of interest.

The car 1 is provided with a plurality of wheels 2. Moreover, the car 1 is provided with a high accuracy position/orientation determination device. As shown in FIG. 1, the position determination device comprises the following components:

- a GPS (global positioning system) unit connected to an antenna 8 and arranged to communicate with a plurality of satellites SLi (i=1, 2, 3, ... ) and to calculate a position signal from signals received from the satellites SLi. The GPS unit is connected to a microprocessor µP. Based on the signals received from the GPS unit, the microprocessor µP may determine suitable display signals to be displayed on a monitor 4 in the car 1, informing the driver where the car is located and possibly in what direction it is travelling.
- a DMI (Distance Measurement Instrument). This instrument is an odometer that measures a distance traveled by the car 1 by sensing the number of rotations of one or more of the wheels 2. The DMI is also connected to the microprocessor µP to allow the microprocessor µP to take the distance as measured by the DMI into account while calculating the display signal from the output signal from the GPS unit.
- an IMU (Inertial Measurement Unit). Such an IMU can be implemented as 3 gyro units arranged to measure rotational accelerations and translational accelerations along 3 orthogonal directions. The IMU is also connected to the microprocessor µP to allow the microprocessor µP to take the measurements by the DMI into account while calculating the display signal from the output signal from the GPS unit.

The system as shown in FIG. 1 is a so-called "mobile mapping system" which collects geographic data, for instance by taking pictures with one or more camera(s) 9(i) mounted on the car 1. The camera(s) are connected to the microprocessor µP. Moreover, the laser scanner(s) 3(j) take laser samples while the car 1 is driven. They are also connected to the µP and send these laser samples to the µP.

It is a general desire to provide as accurate as possible location and orientation measurements from the 3 measurement units: GPS, IMU and DMI. These location and orientation data are measured while the camera(s) 9(i) take pictures and the laser scanner(s) 3(j) take laser samples. Both the pictures and the laser samples are stored for later use in a suitable memory of the µP in association with corresponding location and orientation data of the car 1 at the time these pictures and laser samples were taken.

Figure 2:
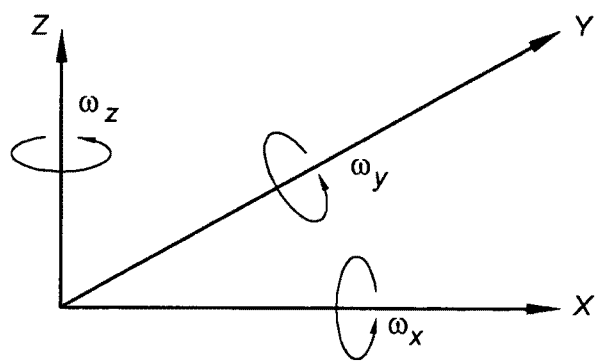
FIG. 2 shows a diagram of location and orientation parameters.

FIG. 2 shows which position signals can be obtained from the three measurement units GPS, DMI and IMU shown in FIG. 1. FIG. 2 shows that the microprocessor µP is arranged to calculate 6 different parameters, i.e., 3 distance parameters x, y, z relative to an origin in a predetermined coordinate system and 3 angle parameters $\omega_x$, $\omega_y$, and $\omega_z$, respectively, which denote a rotation about the x-axis, y-axis and z-axis respectively. The z-direction coincides with the direction of the gravity vector.

The pictures and laser samples include information as to building block façades. In an embodiment, the laser scanner(s) 3(j) are arranged to produce an output with minimal 50 scans per second and 1 deg resolution in order to produce an output of high enough density. (At a speed of 50 km per hour the car drives a distance of 0.28 m per scan. And a 1 deg angular resolution covers approximately a 0.22 m area at a distance of 10 m.) A laser scanner such as MODEL LMS291-S05 produced by SICK is capable of producing such output.

The microprocessor in the car may be implemented as a computer arrangement. An example of such a computer arrangement is shown in FIG. 3.

Figure 3:
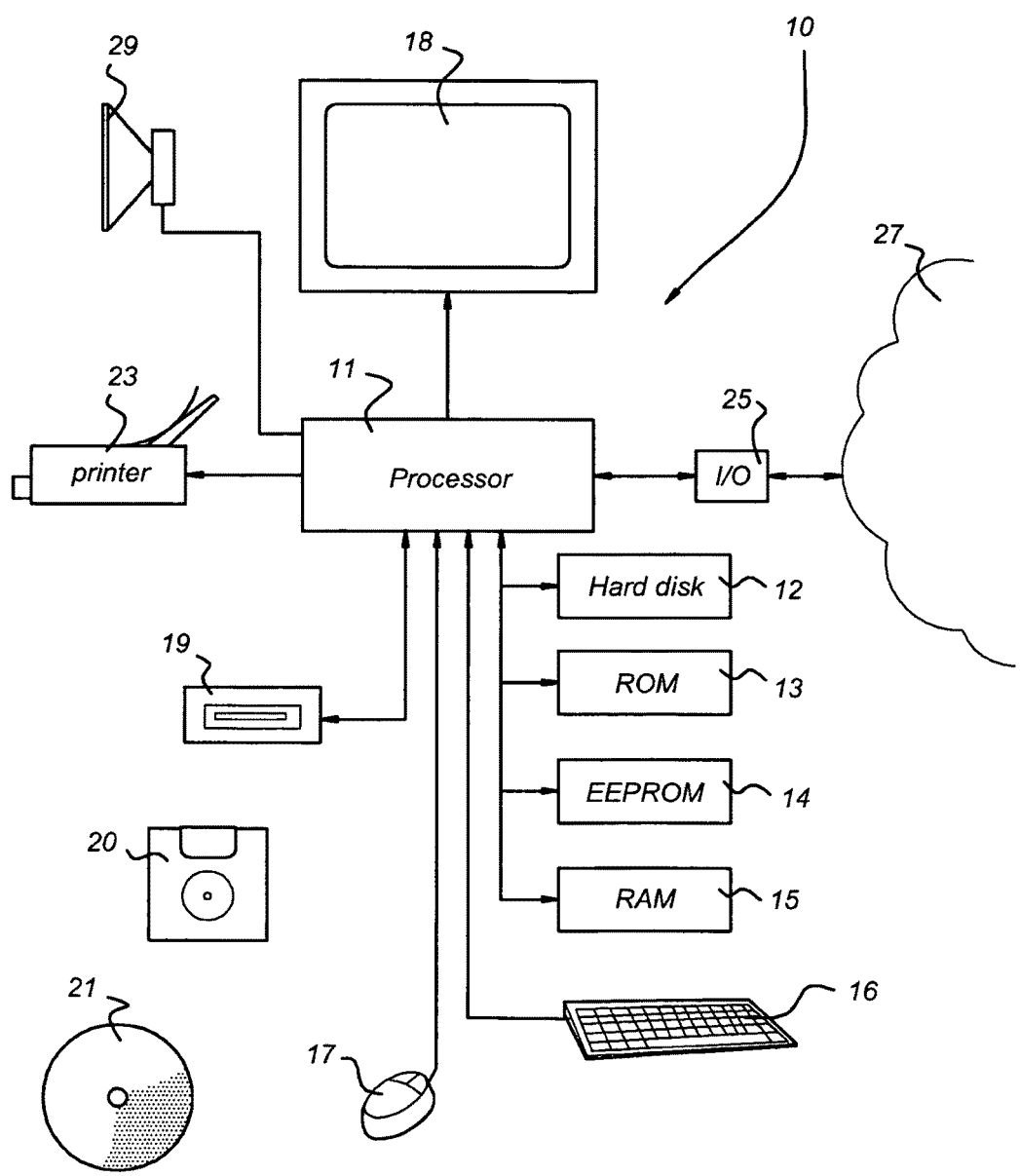
FIG. 3 shows a diagram of a computer arrangement with which the invention can be performed.

In FIG. 3, an overview is given of a computer arrangement 10 comprising a processor 11 for carrying out arithmetic operations.

The processor 11 is connected to a plurality of memory components, including a hard disk 12, Read Only Memory (ROM) 13, Electrically Erasable Programmable Read Only Memory (EEPROM) 14, and Random Access Memory (RAM) 15. Not all of these memory types need necessarily be provided. Moreover, these memory components need not be located physically close to the processor 11 but may be located remote from the processor 11.

The processor 11 is also connected to means for inputting instructions, data etc. by a user, like a keyboard 16, and a mouse 17. Other input means, such as a touch screen, a track ball and/or a voice converter, known to persons skilled in the art may be provided too.

A reading unit 19 connected to the processor 11 is provided. The reading unit 19 is arranged to read data from and possibly write data on a data carrier like a floppy disk 20 or a CDROM 21. Other data carriers may be tapes, DVD, CD-R. DVD-R, memory sticks etc. as is known to persons skilled in the art.

The processor 11 is also connected to a printer 23 for printing output data on paper, as well as to a display 18, for instance, a monitor or LCD (Liquid Crystal Display) screen, or any other type of display known to persons skilled in the art.

The processor 11 may be connected to a loudspeaker 29.

The processor 11 may be connected to a communication network 27, for instance, the Public Switched Telephone Network (PSTN), a Local Area Network (LAN), a Wide Area Network (WAN), the Internet etc. by means of I/O means 25. The processor 11 may be arranged to communicate with other communication arrangements through the network 27.

The data carrier 20, 21 may comprise a computer program product in the form of data and instructions arranged to provide the processor with the capacity to perform a method in accordance with the invention. However, such computer program product may, alternatively, be downloaded via the telecommunication network 27.

The processor 11 may be implemented as stand alone system, or as a plurality of parallel operating processors each arranged to carry out subtasks of a larger computer program, or as one or more main processors with several sub-processors. Parts of the functionality of the invention may even be carried out by remote processors communicating with processor 11 through the network 27.

It is observed that when applied in the car 1 the computer arrangement does not need to have all components shown in FIG. 3. For instance, the computer arrangement does not need to have a loudspeaker and printer then. As for the implementation in the car 1, the computer arrangement needs at least processor 11, some memory to store a suitable program and some kind of interface to receive instructions and data from an operator and to show output data to the operator.

For post-processing the pictures and scans as taken by the camera(s) 9(i) and the laser scanner(s) 3(j) a similar computer arrangement as the one shown in FIG. 3 will be used, be it that that computer arrangement will not be located in the car 1 but may conveniently be located in a building for off-line post-processing. The pictures and laser samples as taken by camera(s) 9(i) and scanner(s) 3(j) are stored in one of the memories 12-15. That can be done via storing them first on a DVD, memory stick or the like, or transmitting them, possibly wirelessly, from the computer arrangement located in the car 1.

Figure 4:
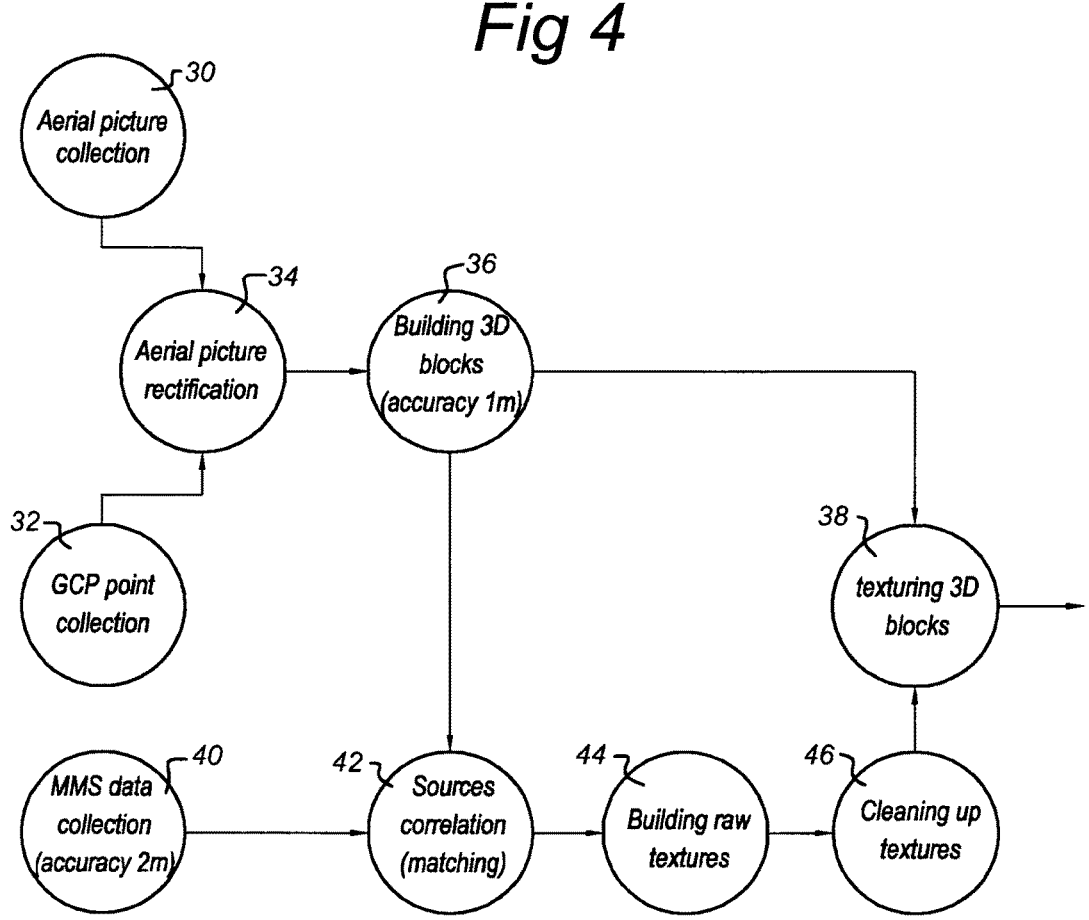
FIG. 4 shows a block diagram of actions performed to texture 3D building blocks.

For a better understanding of the invention, first of all a context of the invention will be described with reference to FIG. 4. FIG. 4 shows a simplified data flow in modeling textured 3D city buildings.

FIG. 4 shows that the process has two sources of data:
1. aerial pictures 30 (for instance taken by airplanes, helicopters or satellites) together with ground control points 32 (GCP). A ground control point is a point on the surface of the earth of known location (i.e. fixed within an established co-ordinate system) typically obtained from manual GPS measurement surveys and which is used to geo-reference image data sources, such as remotely sensed images or scanned maps.
2. data 40 taken by for instance a MMS system (cf. FIG. 1). The data collected by the MMS system comprises two different data portions: first of all pictures as taken by the camera(s) 9(i) and secondly laser samples as collected by the laser scanner(s) 3(j). For the sake of simplicity, the pictures are called "MMS pictures" although they may originate from another source.

Figure 5:
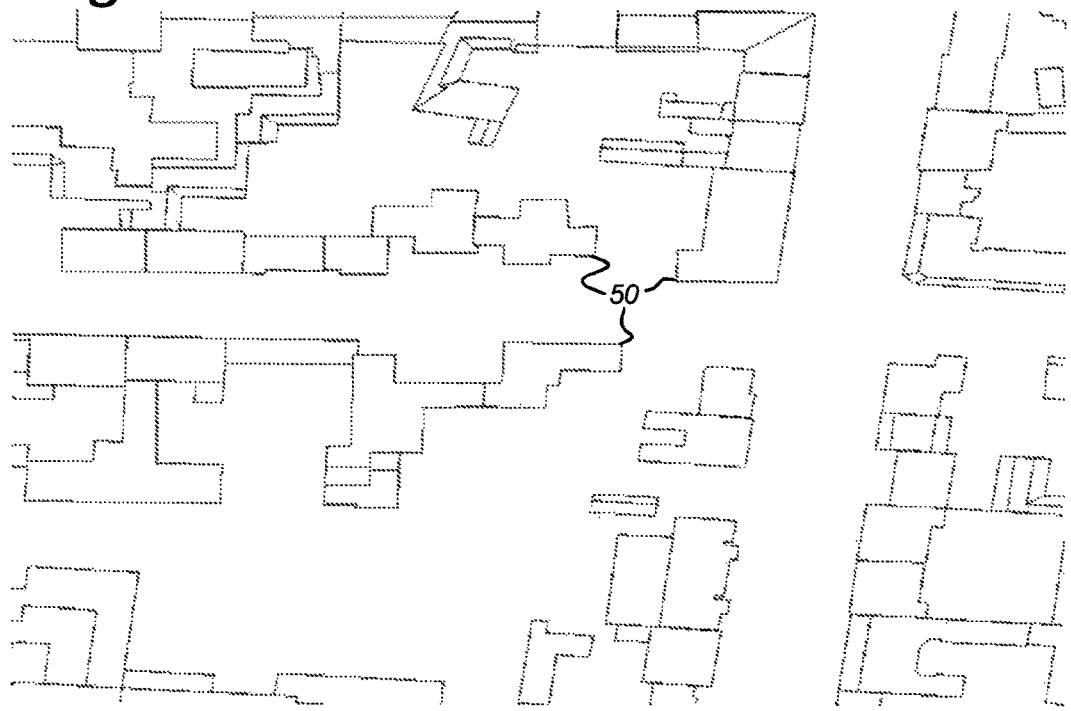
FIG. 5 shows an example of footprints of some building blocks.

The aerial pictures 30 are rectified 34 in order to produce positionally accurate aerial images with relief distortion eliminated. From these rectified aerial pictures, by using standard photogrammetrical methods, data outlining building blocks (sometimes called building footprints) 36 are produced. FIG. 5 shows an example of such building footprints of 3D blocks.

Each line of a building footprint represents the top view of the edge of a building wall. The outer look of this wall is what we call the building façade. In order to make such 3D presentation of the buildings realistic, the building blocks need to be provided with texture information on their façades, for which the best source nowadays comprises pictures taken by camera (s) 9(i) of the MMS. Each of the building block façades requires a separate texture to be applied. In order to place this texture information accurately onto the façade, there is a need to have an accurate location correlation 42 between a MMS picture 40 and a corresponding building block 36, i.e., corners of the building blocks as obtained from the aerial pictures have to accurately match corners of the building block façade on the MMS pictures 40 as obtained from the camera(s) 9(i). If such an accurate location correlation 42 is present there is an automatic way of extraction of so-called raw textures, which represent a mapped part of the picture corresponding to a specific façade.

If a façade is fully visible in one MMS picture 40 the accuracy requirement is not as strict as if façade information needs to be extracted from multiple MMS pictures, which, in reality, occurs in more than 95% of the cases.

After building raw textures 44, the textures may be cleaned up 46 by a semi-automated process, and after cleaning each such cleaned texture is applied to the corresponding façade in an action 38 called "texturing 3D blocks".

The present invention is related to the actions indicated in FIG. 4 with "sources correlation" 42 and "building raw textures" 44. The invention has a positive impact on processing cost and speed. The invention allows one to save time by making the process of correlation automatic.

Input Data

The following input data is provided to perform the processing:
1. Building footprints
2. Mobile mapping system (MMS) track line
3. Laser data correlated with track line
4. MMS camera collected images now.

These input data are further defined and their role in the processing is explained 1. Building Footprints Building footprints are defined as being the top down view of the 3D building block shapes as collected from aerial pictures or another data source. The data as to these building footprints are stored in memory 12-15 such that they can be accessed and used by the processor 11. The façade pictures as taken by the mobile mapping system, MMS, are also stored in memory 12-15 and are to be locally correlated to these building footprints, i.e., the façade pictures should be digitally associated with the building footprints such that the 2D projection of the façade pictures on the earth are substantially at the same location as the building footprints from the aerial photographs. So, the building block pictures should be geo-referenced with a known coordinate system, projection or other reference which allows finding their position in relation to MMS system data (façade pictures).

FIG. 5 shows an example of such building footprints 50.

2. Mobile Mapping System (MMS) Track Line

A second collection of data needed for the method of the invention is a set of location and orientation data indicating the route traveled by the MMS system as well as its direction and orientation of travelling along all locations of the route, here, called the MMS track line. This set is made up of a plurality of location and orientation samples. The location and orientation samples are stored in memory 12-15 and accessible to the processor 11. The numbers of these samples depend on the system used to collect these samples while travelling along the route with the MMS system. An example of the system used has been shown in FIG. 1 and is explained above. In that system the samples are collected a predetermined times per second.

The location and orientation samples are available in a sequence according to the time of collection. The consecutive locations of the MMS system are geo-referenced with a known coordinate system, projection or other reference. This reference is the same as, or related to, the reference of the aerial photos from which the building footprints were derived which allows finding the MMS position in relation to the building footprints. The process of geo-referencing the location and orientation data can be the same as described in co-pending, non-published patent application "Arrangement for and method of off-line precision location measurement". The method described in that patent application is an off-line method which processes location and orientation data off-line in order to improve the accuracy of both the location and the orientation data of the MMS system.

Figure 6:
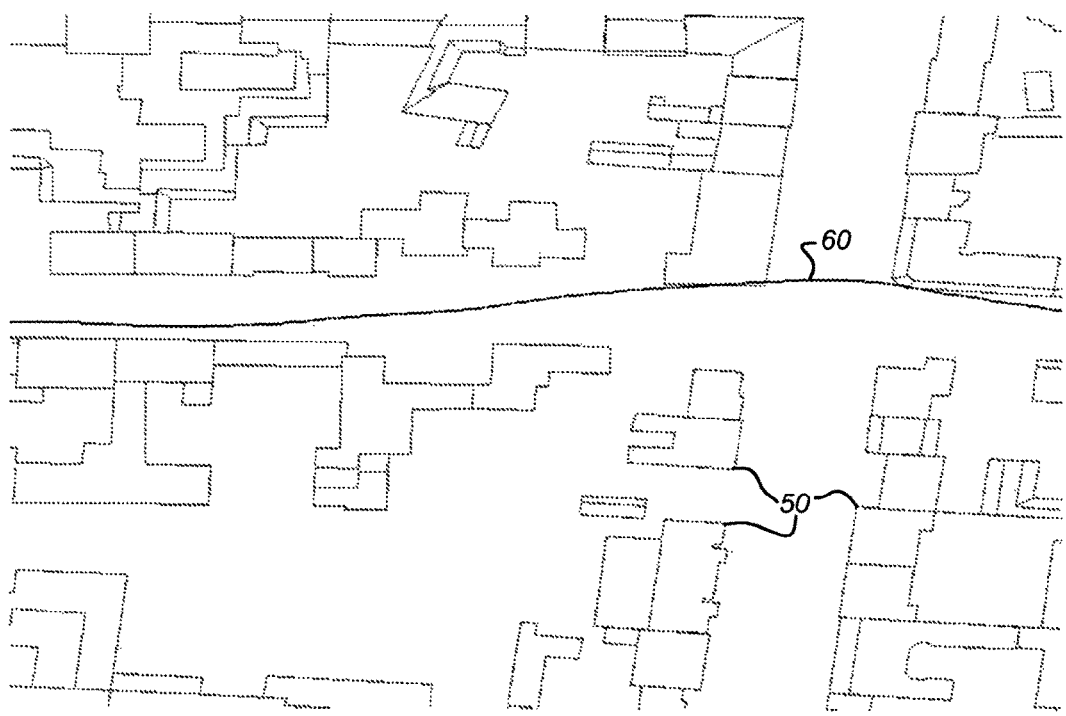
FIG. 6 shows the footprints of FIG. 5 together with a track line of a MMS system.

FIG. 6 shows an example of a MMS track line 60 in relation to the building footprints 50. Note that the track line 60 and the building footprints 50 originate from totally different sources and, therefore, most probably have location and orientation errors relative to one another.

3. Laser Data Correlated with Track Line

A third set of data needed to perform the method according to the invention, is a set of geo-referenced laser samples collected with the laser scanner(s) 3(j) mounted on the MMS system. In an embodiment, the laser scanner(s) are 2D laser scanner(s). A 2D laser scanner 3(j) provides a triplet of data comprising time of measurement, angle of measurement, and distance to nearest solid object that is visible at this angle from the laser scanner 3(j). Furthermore, the laser scanner(s) 3(j) needs to be correlated in time with the MMS positioning system, as well as with the time of making pictures with the camera(s) 9(i). A preferable time correlation is below 1 ms. Having laser scanner samples and MMS position data coupled as to time of collection, the processor 11 can combine the laser scanner samples with the MMS position data to give a point cloud in a 3D space. Such combining can be calculated on-line or preferably in a post-process. These laser scanner samples are now geo-referenced. So, each laser scanner sample is synchronized to the MMS location samples by the time of collection of these data. Again, the laser samples are stored in memory 12-15 and are accessible to the processor 11.

Figure 7:
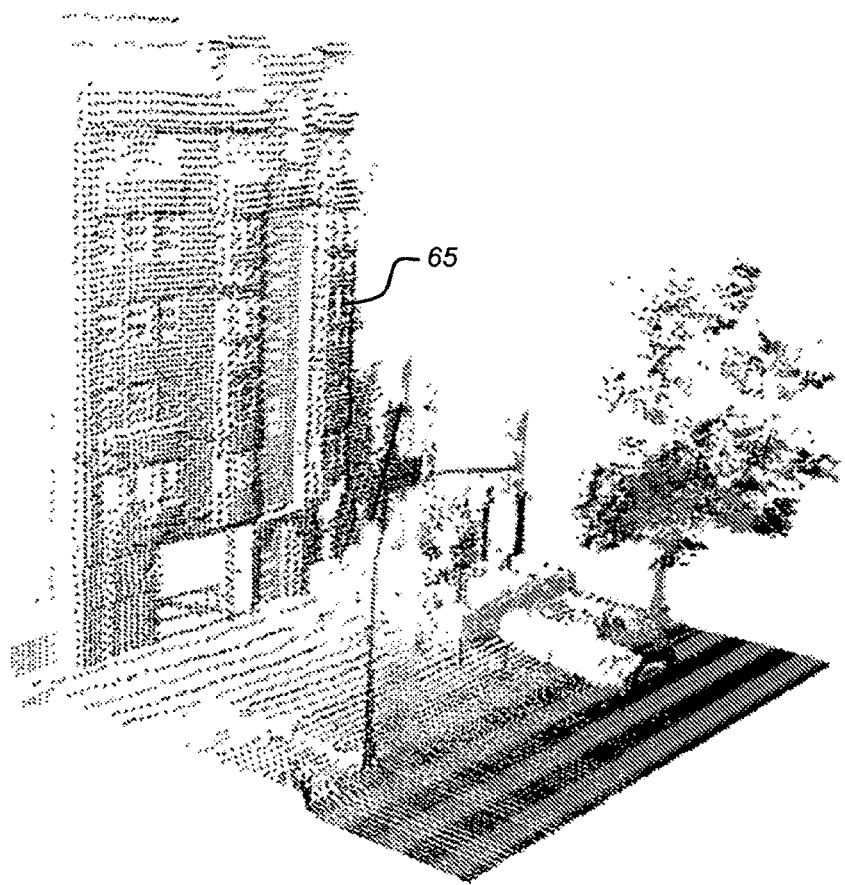
FIG. 7 shows the output of a laser scanner pointed at a building façade and represented in 3D perspective.

FIG. 7 shows an example of laser sample data taken across a typical building façade 65.

Figure 8:
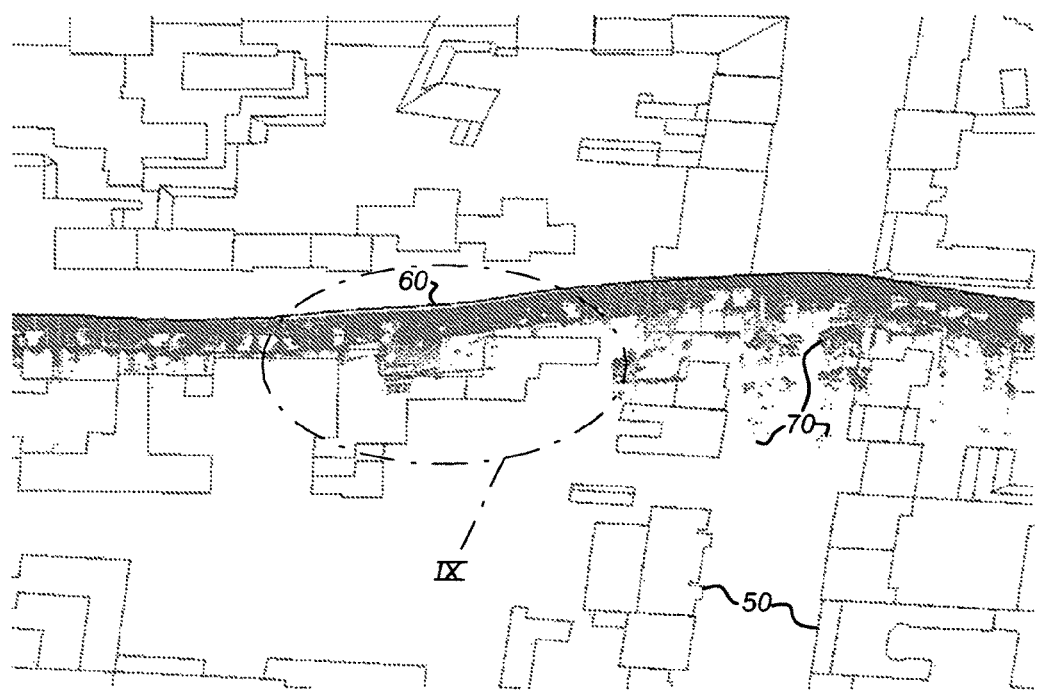
FIG. 8 shows sets of raw laser scanner samples as collected by a MMS system in the situation shown in FIG. 6.

FIG. 8 shows an example of a 2D, top down, view of such laser sample data 70 in relation to the building footprints and the track line 60 as already shown in FIG. 6. Note that the laser sample data 70 is already location correlated to the track line 60.

Output Data

The computer arrangement of FIG. 3 stores a computer program that is suitable to instruct the processor 11 to perform a method of processing the three sets of data mentioned above. One of the final outputs of the process is a set of local shift vectors related to the location samples of the track line of the MMS system indicating a 2D shift (if any) of these location samples in order to produce shifted location samples that are synchronized with the building footprints such that the orientation and location of the MMS system in each such location sample is correlated to the orientation and location of the building footprints. This shift corrects for differential errors between the geopositions of the MMS and geopositions of the orthorectified aerial photos/building block footprints.

Algorithm

The algorithm to produce the set of local shift vectors comprises the following main actions:

1. Laser Mesh Filtering

Figure 9A:
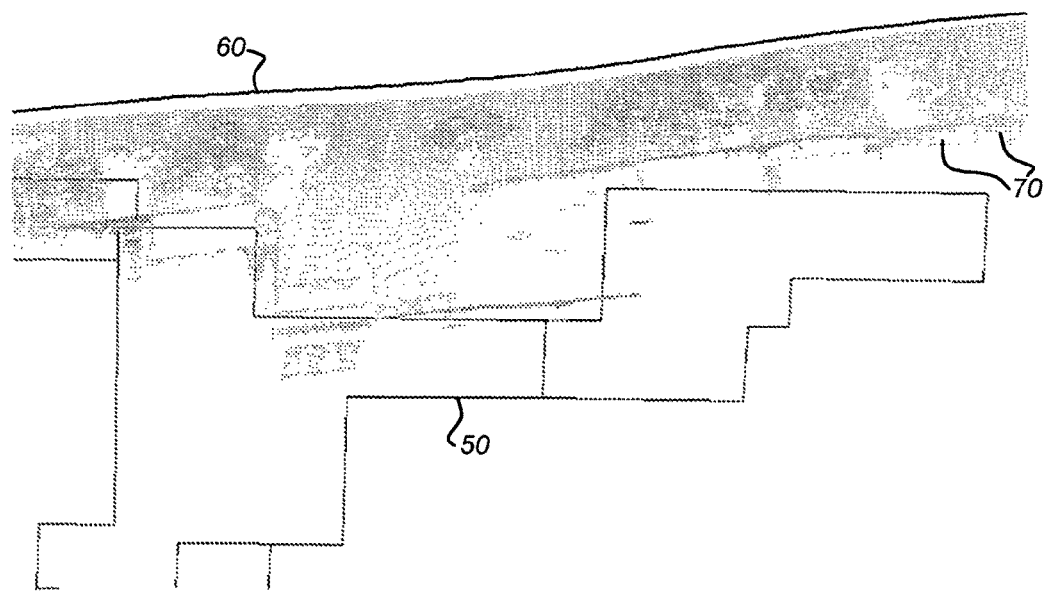
FIG. 9a shows a similar example as FIG. 8 but on an enlarged scale to further clarify the invention.

FIG. 9a shows an example of a 2D, top down, view of laser sample data 70 in relation to building footprints 50 and track line 60 on an enlarged scale compared to FIG. 8 to facilitate the explanation. The laser samples 70 are filtered, as will be explained now.

In this laser sample filtering phase the processor 11 only selects a subset of the laser samples. The laser samples that are selected are associated with the front (or street facing) edges (façades) of the building blocks. The processor 11 performs the following actions to find them (see FIGS. 9b and 9c):

a) as shown in FIG. 9b, in a first action, the processor 11 first selects laser samples as collected by a laser scanner 3(j) in a plane substantially perpendicular to the earth, i.e., laser samples collected during one sweep of the laser scanner 3(j). The selected laser samples belong to reflections of the laser beam as produced by laser scanner 3(j) against solid objects. Any method as known to persons skilled in the art may be used to collect these laser samples. The locations of these selected laser samples are indicated with reference signs ls(n), n=1, 2, 3, . . . , N. Laser sample locations ls(1) . . . ls(5) are associated with reflections of the laser beam against the earth. Laser sample locations ls(6) . . . ls(8) are associated with reflections of the laser beam against an object in front of the façade 65. Laser sample locations ls(9) and ls(10) are associated with reflections of the laser beam against the façade 65. Laser sample locations ls(11) and ls(12) are associated with reflections of the laser beam against an object that extends from the façade, like a balcony 67. Finally, sample locations ls(13)-ls(17) are again associated with reflections of the laser beam against the façade 65. It is observed that all these locations ls(n) are known and stored in memory 12-15.

b) in a second action, the processor 11 calculates a set of vectors v(m), where m=1, 2, 3, . . . , N−1 and each vector v(m) has a starting point in laser sample location ls(m) and an end point in laser sample location ls(m+1);

c) in a third action, the processor 11 calculates the direction of the vectors v(m) relative to the earth. Those vectors v(m) that are substantially perpendicular to the earth are selected from the set of vectors v(m). One way of doing this is as follows. The processor 11 calculates for which vectors v(m) the following equation holds:

$$|\sin(A)| \geq 1-\epsilon, \epsilon \geq 0,$$

where the value of parameter $\epsilon$ is near to 0, for instance 0.8, and can be obtained empirically, and A equals the angle between the vector v(m) concerned and the earth plane (cf. FIG. 9c).

d) in a fourth action, the processor 11 groups consecutive vectors and produces subsets of consecutive vectors that are all substantially perpendicular to the earth. For instance, in the example of FIG. 9c, the processor 11 would produce 3 such subsets: v(9), v(11), and v(13) . . . v(16) (so, two subsets with only one vector).

e) in a fifth action, the processor 11 selects the subset of consecutive vectors from all subsets of consecutive vectors which starts on a specified height above the earth and has at least a predetermined minimal length (distance from start of first vector of that subset to end of last vector of that subset). If more than one subset fulfils this condition, the longest subset is selected. In the example of FIG. 9b, the selected subset would comprise the vectors v(13) . . . v(16).

f) in a sixth action, each laser sample associated with the vectors that are selected in this way by processor 11 is projected by processor 11 to the earth plane. This is indicated with a dotted line in FIG. 9c. Note that vectors v(13) . . . need not lie on one line or in one plane. So, this projection probably renders several projection points. Then, on the basis of calculating a median (for instance, average or other value) of these points the processor 11 obtains a laser estimated front edge point.

g) The processor 11 repeats these six actions above for a plurality of such sets of laser samples associated with a plurality of sweeps of the laser beam along the track line 60. Generally this need not be done for each laser sweep. This last action renders a laser estimated front edge base.

The third action that renders vectors v(m) substantially perpendicular to the earth plane allows selecting candidate laser sample sequences, which may relate to the building façades. The fifth action concerning selecting only subsets of consecutive vectors that start at specified heights allows filtering of objects like cars or plants, which are mainly near the earth. The condition concerning the minimal vector length allows for increasing the probability that the finally selected group represents a building façade.

As a result of this filtering and projection action the processor 11 obtains a laser estimated front edge base which determines the front edges of building blocks as measured with respect to the car track line 60. The laser estimated front edge base is shown in FIG. 10 and indicated with reference sign 72.

Figure 10:
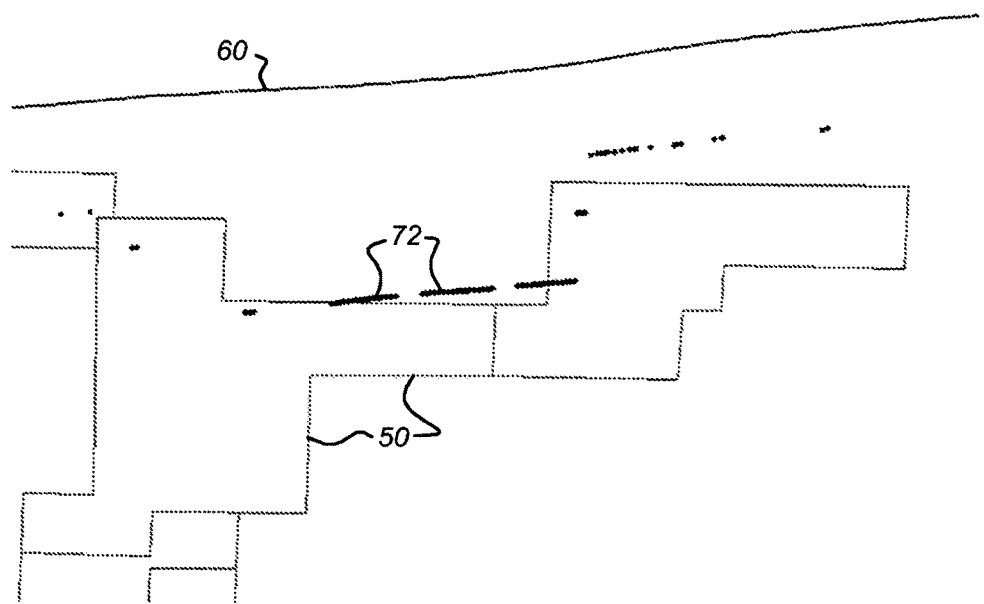

This method of determining the edge of a building block is very powerful, even in places where the track line 60 is not parallel to the building façade (as is the case in FIG. 10). However, other methods may be used like the one explained in copending application "System for and method of processing laser scan samples and digital photographic images relating to building façades" to derive the front edges of the building blocks from the laser samples with histograms.

2. Production of Laser Point Local Shift

Figure 11:
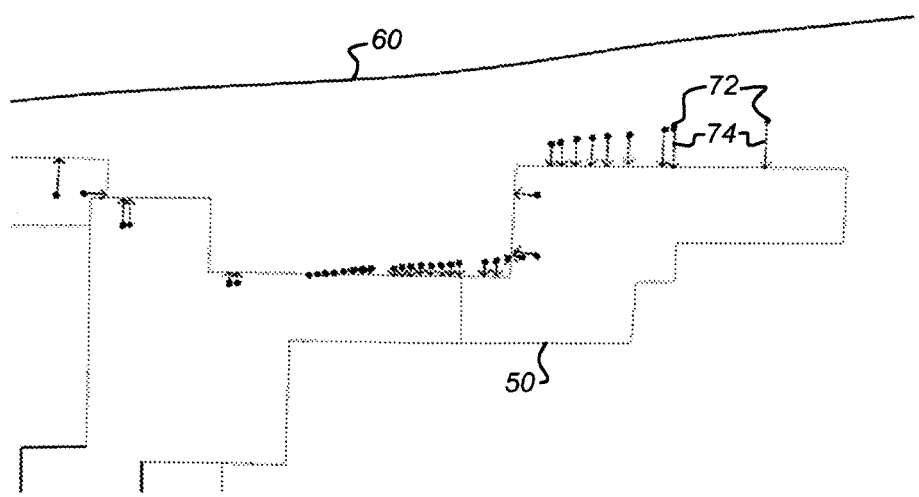
FIG. 11 shows how laser samples associated with the façade are mapped to the same façade as derived from aerial pictures.

In this action, for each laser sample that belongs to the output of the filtering and projection action, the processor 11 calculates a local shift vector 74 from the projected laser sample position to the nearest building block front edge. This is done by calculating the vector that is perpendicular to the building block, starts at the location of a laser estimated front edge base and ends on the front edge of the building block. FIG. 11 shows these local shift vectors 74 for the laser estimated front edge samples 72. These local shifts represent the relative error difference between the absolute position measurement of the geo-positioned MMS and the absolute position measurement of the front edge of the building block as measured from the aerial image.

3. Production of Car Point Local Shift

Figure 12:
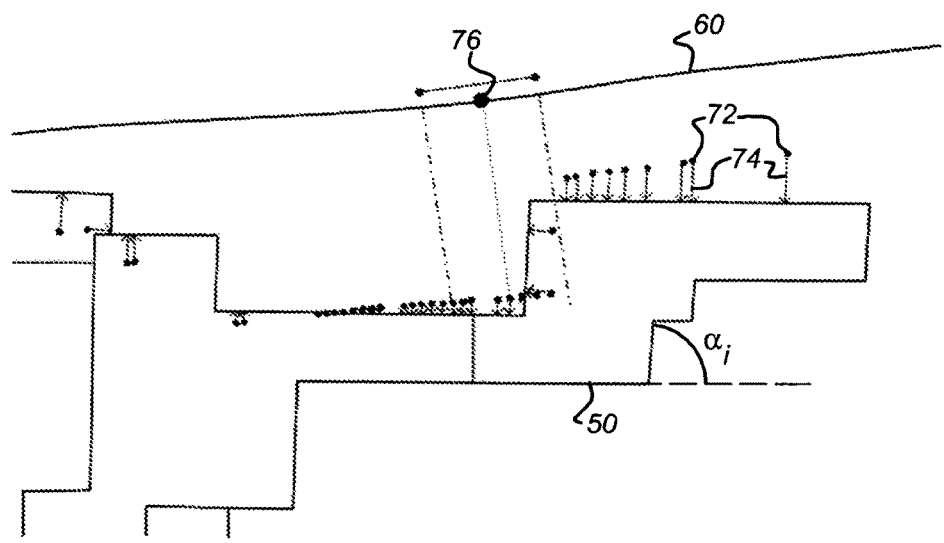
FIGS. 12 and 13 show how the track line of the MMS system is shifted such that it corresponds to the façade as derived from the aerial pictures.

In this action, the processor 11 collects a sub-set of adjacent laser estimated front edge points for each selected car track point in a set of car track points (the set corresponds, for instance, with a street or portion of a street). A car track point is a location on the car track line 60 as measured with the MMS system shown in FIG. 1. FIG. 12 shows a car track point 76. The sub-set of laser estimated front edge points that is selected is associated with the set of laser samples as collected with the laser scanner 3(j) on the MMS system within a predetermined distance forward and backward from the car track point 76 concerned along the track line 60 (one of the assumptions is that the laser samples and car track points 76 are correlated). The processor 11 now calculates a second set of local shift vectors 78 for each of the car track points 76 in the set of car track points while using the selected laser estimated front edge points. It is performed with the following equations:

$$len(x_i, y_i) = sqrt(x_i^2 + y_i^2),$$

$$car\_pt\_vec\_X = \frac{\sum_{i=0}^{n} x_i |\cos\alpha_i| f(i) * len(x_i, y_i)}{\sum_{i=0}^{n} |\cos\alpha_i| f(i) * len(x_i, y_i)},$$

$$car\_pt\_vec\_Y = \frac{\sum_{i=0}^{n} y_i |\sin\alpha_i| f(i) * len(x_i, y_i)}{\sum_{i=0}^{n} |\sin\alpha_i| f(i) * len(x_i, y_i)},$$

where:
(car_pt_vec_X, car_pt_vec_Y) track point shift vector 78,
$(x_i, y_i)$ shift vector for local selected laser estimated front edge point with index i (i=1, . . . n),
$\alpha_i$—angle of matched building block edge to laser point with index i,
$f(i)$—function with values between 0 and 1, inversely proportional to distance between current car track point 76 and car track point corresponding to laser estimated front edge point shift vector $(x_i, y_i)$ with index i. A value of function $f(i)$ equal to 1 means that these points are in the same position.
n—number of shift vectors $(x_i, y_i)$ for local selected laser estimated front edge points.

Objects matched to the nearest face by means of the above equations are determining shifts that are perpendicular to that façade face. This is because displacements can be measured in one direction having linear to point comparison. Further weigh application of the shifts causes vectors to align to final shift from multiple façades.

The processor 11 calculates the local track point shift vectors 78 for all car track points 76 in the set of track points. Then processor 11 shifts each car track point 76 with the calculated local track point shift vector 78. This renders a shifted car track line 60' (see FIG. 13).

Figure 13:
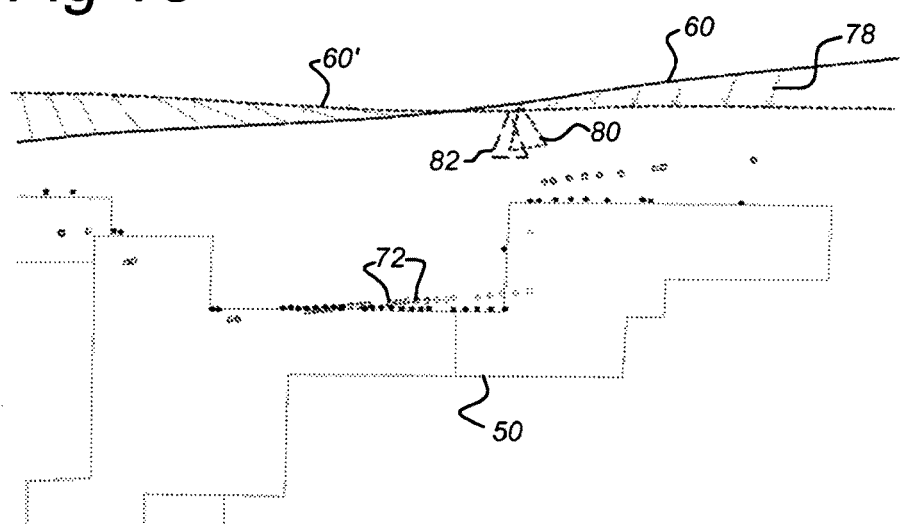
Figure 14A:
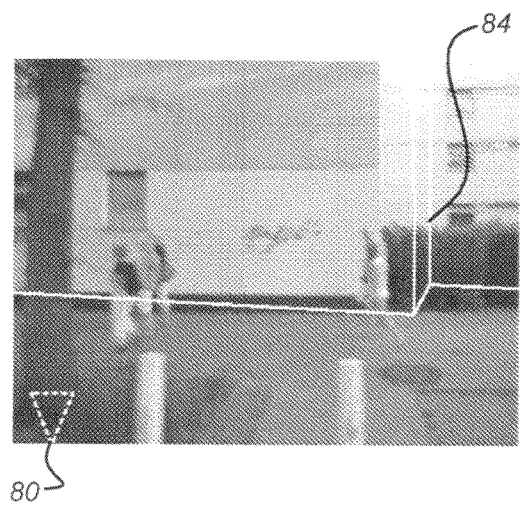
FIGS. 14a and 14b show how the façade as seen from the camera picture taken from the MMS system is mapped to the façade as defined by the aerial pictures.
Figure 14B:
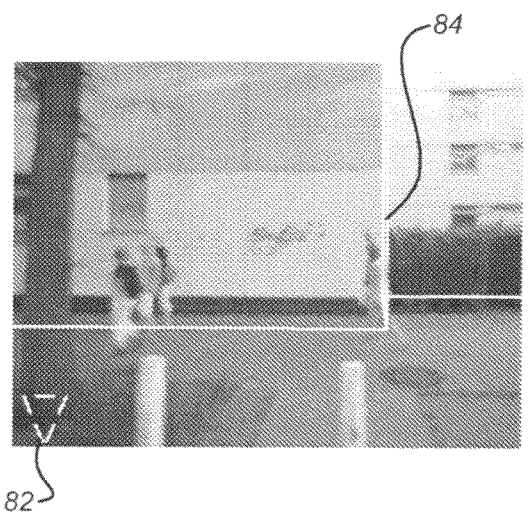

FIG. 13 also shows two triangles 80, 82. The first triangle 80 schematically shows a viewing angle from a car track point on the track line 60, whereas the second triangle 82 schematically shows the viewing angle from the shifted car track point on the shifted track line 60'. FIGS. 14a and 14b show an example of how the shifted viewing angle now matches with a picture of a building block. In FIG. 14a a building block shape as measured with the first source (for instance aerial image) is shown with reference sign 84 as well as the same building as seen from the camera(s) on the MMS system. FIG. 14a shows a clear mismatch in position and orientation. FIG. 14b shows the same two views however after performing the method as explained above in which the track line 60 has been shifted to track line 60'.

It is observed that the algorithm as described above can be repeated one or more times until a predetermined criteria concerning a distance error between the laser samples and building block edges is met.

In an embodiment, not all car track points of a set of car track points are selected. Since the location and orientation measurement as made by a MMS system with which façade pictures are made may have a high accuracy it is not necessary to exactly determine a shift vector for each car track point 76 on which a picture is made. Shift vectors 78 for non-selected car track points can be calculated as weighted sum of shift vectors 78 determined in accordance with the method explained above for one or more selected car track points in the neighbourhood of the non-selected car track point.

So, in its broadest context the present invention relates to a computer arrangement with processor 11 and some kind of memory 12; 13; 14; 15 that stores a suitable computer program, object data originating from a first source and including object location data, and laser samples originating from a second source, including a sub-set of laser samples relating to the object and including laser sample location data as to each laser sample. The processor 11 compares the object location data and the laser sample location data of the sub-set of laser samples, and matches the object location data to the laser sample location data of the sub-set of laser samples based on this comparison, and thereby corrects for relative positional errors between the first and second sources of location data. The object may be a building façade.

In an embodiment, this correction action is used in a matching process in which texture elements derived from photographic pictures are matched to building façades as derived from another source like aerial pictures.

In another aspect of the invention, it relates to a computer arrangement with processor 11 and some kind of memory 12; 13; 14; 15 that stores a suitable computer program comprising instructions and data that can be run by the processor, and a plurality of series of consecutive laser samples relating to a plurality of physical objects and including laser sample location data as to each laser sample. Each series of laser samples lies in a separate plane substantially perpendicular to the earth. The processor 11 calculates a series of consecutive vectors, each series of consecutive vectors being associated with a series of laser samples, each vector having a beginning point in a laser sample and an end point in a next laser sample in the series of consecutive laser samples. Then, the processor 11 identifies shapes of at least portions of those objects based on the consecutive vectors.

The invention claimed is:

1. A method of aligning building block footprint data and laser samples, comprising:
    accessing stored location data associated with a building block footprint originating from a first source;
    accessing a plurality of stored sweeps of laser samples originating from a second source, each sweep of laser samples being oriented perpendicular to the earth plane and having locations associated with the reflection of a laser beam against a solid object and relative to one of a plurality of geo-reference points;
    selecting a subset of the laser samples for each of the stored sweeps relating to a façade of the building block footprint;
    projecting the locations associated with the subset for each of the stored sweeps of laser samples to the earth plane to obtain a plurality of estimated edge points of the façade of the building block footprint;
    calculating a shift vector for each estimated edge point that when applied, shift the estimated edge points to coincide with the portion of the building block footprint data representative of the façade, wherein the shift vector is a vector projected from the estimated edge point to the nearest point on the building block footprint edge; and
    using said shift vectors to align the laser sample location data to the building block footprint location data.

2. The method of claim 1, wherein said selecting a subset of laser samples from each of the stored sweeps relating to the façade of the building block footprint comprises:
    creating line segments by connecting adjacent laser sample locations;
    identifying and grouping those line segments that are substantially collinear with other line segments and that extend substantially perpendicular to the earth;
    determining a length from the point nearest to the earth plane to the point farthest from the earth plane of the points used to create each group of line segments; and
    identifying the laser samples related to the façade as those used to create the line segments making up the group with the longest determined length.

3. The method of claim 2, wherein said projecting the locations associated with the subset of laser samples for each stored sweep related to the façade of the building block footprint, to the earth plane to obtain a plurality of estimated edge points of the façade of the building block footprint comprises vertically projecting the locations associated with the selected laser samples to the earth plane to obtain a plurality of projection points, and calculating a median of the projection points to obtain an estimated edge point.

4. The method according to claim 1, further comprising accessing stored photographic pictures including texture information of said building façade, the photographic pictures originating from a third source having a known location in relation to the second source, and using said shift vectors to provide said building façade with said texture information.

5. A non-transitory computer readable medium containing software that when executed on a computer arrangement causes the computer arrangement to perform the method of claim 1.

6. Computer arrangement, comprising a memory and a processor arranged to communicate with the memory, the memory storing a computer program including instructions and data that can be run by the processor, and storing location data associated with a building block footprint originating from a first source and sweeps of laser samples oriented perpendicular to the earth plane, and originating from a second source, each sweep of laser samples having a location relative to one of a plurality of geo-reference points and associated with the reflection of a laser beam against a solid object, said computer program run on the processor being arranged to:
    access stored location data associated with a building block footprint;
    access a plurality of stored sweeps of laser samples;
    select a subset of the laser samples for each of the stored sweeps relating to a façade of the building block footprint;
    project the locations associated with the subset for each of the stored sweeps of laser samples to the earth plane to obtain a plurality of estimated edge points of the façade of the building block footprint;
    calculate a shift vector for each estimated edge point that when applied shift the estimated edge points to coincide with the portion of the building block footprint representative of the façade, wherein the shift vector is a vector projected from the estimated edge point to the nearest point on the building block footprint edge; and use said shift vectors to align the laser sample location data to the building block footprint location data.

* * * * *